US009188738B2

(12) United States Patent
Taira et al.

(10) Patent No.: US 9,188,738 B2
(45) Date of Patent: Nov. 17, 2015

(54) TRANSLUCENT POLYCRYSTALLINE MATERIAL AND MANUFACTURING METHOD THEREOF

(75) Inventors: Takunori Taira, Okazaki (JP); Jun Akiyama, Okazaki (JP); Shigeo Asai, Nagoya (JP)

(73) Assignees: Toyota Jidosha Kabushiki Kaisha, Toyota-shi, Aichi-ken (JP); Inter-University Research Institute, National Institutes of Natural Sciences, Tokyo (JP); Genesis Research Institute Incorporated, Nagoya-shi, Aichi-ken (JP)

(*) Notice: Subject to any disclaimer, the term of this patent is extended or adjusted under 35 U.S.C. 154(b) by 0 days.

(21) Appl. No.: 13/983,829

(22) PCT Filed: Jan. 4, 2012

(86) PCT No.: PCT/JP2012/050023
§ 371 (c)(1),
(2), (4) Date: Aug. 6, 2013

(87) PCT Pub. No.: WO2012/111354
PCT Pub. Date: Aug. 23, 2012

(65) Prior Publication Data
US 2013/0320277 A1 Dec. 5, 2013

(30) Foreign Application Priority Data

Feb. 14, 2011 (JP) ................................. 2011-028685

(51) Int. Cl.
*C04B 35/50* (2006.01)
*C04B 35/51* (2006.01)
(Continued)

(52) U.S. Cl.
CPC . *G02B 6/10* (2013.01); *C04B 35/44* (2013.01); *C04B 35/447* (2013.01);
(Continued)

(58) Field of Classification Search
USPC .............. 252/582, 584; 264/1.36, 405; 501/1, 501/151, 152, 127, 153
See application file for complete search history.

(56) References Cited

U.S. PATENT DOCUMENTS 8,470,724 B2 * 6/2013 Taira et al. .................... 501/152
2011/0260367 A1 10/2011 Taira et al.

FOREIGN PATENT DOCUMENTS

JP 48-98684 12/1973
JP 7-237983 9/1995
(Continued)

OTHER PUBLICATIONS

Office Action for Chinese Appl. No. 201280008699.5 dated Dec. 8, 2014.
(Continued)

*Primary Examiner* — Bijan Ahvazi

(57) ABSTRACT

Provided is a method for manufacturing a translucent polycrystalline material with optical properties continuously varying in the material. A slurry including single crystal grains that are acted upon by a force when placed in a magnetic field is immobilized in a gradient magnetic field with a spatially varying magnetic flux density and then sintered. For example, where a slurry including single crystal grains of YAG doped with Er and single crystal grains of YAG undoped with a rare earth material is immobilized in the gradient magnetic field, the region with a strong magnetic field becomes a laser oscillation region that is rich in Er-doped YAG, whereas the region with a weak magnetic field becomes a translucent region rich in YAG undoped with a rare earth material. A polycrystalline material having a core with laser oscillations and a guide surrounding the core are obtained at once.

5 Claims, 9 Drawing Sheets

(51) Int. Cl.
| | |
|---|---|
| *G02B 6/10* | (2006.01) |
| *H01S 3/102* | (2006.01) |
| *H01S 3/106* | (2006.01) |
| *C04B 35/44* | (2006.01) |
| *C04B 35/447* | (2006.01) |
| *C04B 35/495* | (2006.01) |
| *C04B 35/645* | (2006.01) |
| *F21V 9/00* | (2015.01) |
| *G02B 5/02* | (2006.01) |
| *G02C 7/10* | (2006.01) |
| *G02F 1/361* | (2006.01) |
| *G03B 11/00* | (2006.01) |
| *B29D 11/00* | (2006.01) |
| *G02B 1/12* | (2006.01) |
| *H01S 3/06* | (2006.01) |
| *H01S 3/16* | (2006.01) |

(52) U.S. Cl.
CPC .......... *C04B 35/495* (2013.01); *C04B 35/6455* (2013.01); *H01S 3/102* (2013.01); *H01S 3/1066* (2013.01); *C04B 2235/3208* (2013.01); *C04B 2235/3212* (2013.01); *C04B 2235/3213* (2013.01); *C04B 2235/3224* (2013.01); *C04B 2235/3225* (2013.01); *C04B 2235/3227* (2013.01); *C04B 2235/3229* (2013.01); *C04B 2235/3239* (2013.01); *C04B 2235/445* (2013.01); *C04B 2235/605* (2013.01); *C04B 2235/75* (2013.01); *C04B 2235/76* (2013.01); *C04B 2235/764* (2013.01); *C04B 2235/77* (2013.01); *C04B 2235/9653* (2013.01); *H01S 3/061* (2013.01); *H01S 3/0604* (2013.01); *H01S 3/0612* (2013.01); *H01S 3/1611* (2013.01); *H01S 3/1643* (2013.01); *H01S 3/1645* (2013.01); *H01S 3/1685* (2013.01)

(56) References Cited

FOREIGN PATENT DOCUMENTS

| | | |
|---|---|---|
| JP | 2006-264316 | 10/2006 |
| JP | 2007-299621 | 11/2007 |
| JP | 2009-160760 | 7/2009 |
| WO | WO 2010/073712 A1 | 7/2010 |

OTHER PUBLICATIONS

Zhou Shou Zeng, "Super-Strong Permanent Magnet: Rare-Earth Iron-Based Permanent Magnet Material," pp. 173-174, Yejin Gongye Shushe, Feb. 29, 2004.

* cited by examiner

FIG. 2

| Single Crystal Grains in the Slurry | | | Case Number | Polycrystalline Material |
|---|---|---|---|---|
| One Type | Grains Having Magnetic Anisotropy | | 1 | Distribution of Degree of Orientation |
| A Plurality of Types | Grains Upon Which a Translation Force Acts, Grains Having no Magnetic Anisotropy, | Grains Upon Which a Translation Force does not Act, Grains Having no Magnetic Anisotropy | 2 | Distribution of Composition |
| | Grains Having Magnetic Anisotropy, | Grains Having no Magnetic Anisotropy | 2-1 | Uniformly Unorientated |
| | Grains Having Magnetic Anisotropy, | Grains Having Magnetic Anisotropy, Axes of Easy Magnetization Coincide | 2-2 | Distribution of Degree of Orientation |
| | | | 2-3 | Uniformly Orientated |
| | | Grains Having Magnetic Anisotropy, Axes of Easy Magnetization are Different | 2-3-a | Uniformly Orientated |
| | | | 2-3-b | Distribution of Direction of Orientation |

FIG. 4a
FIG. 4b
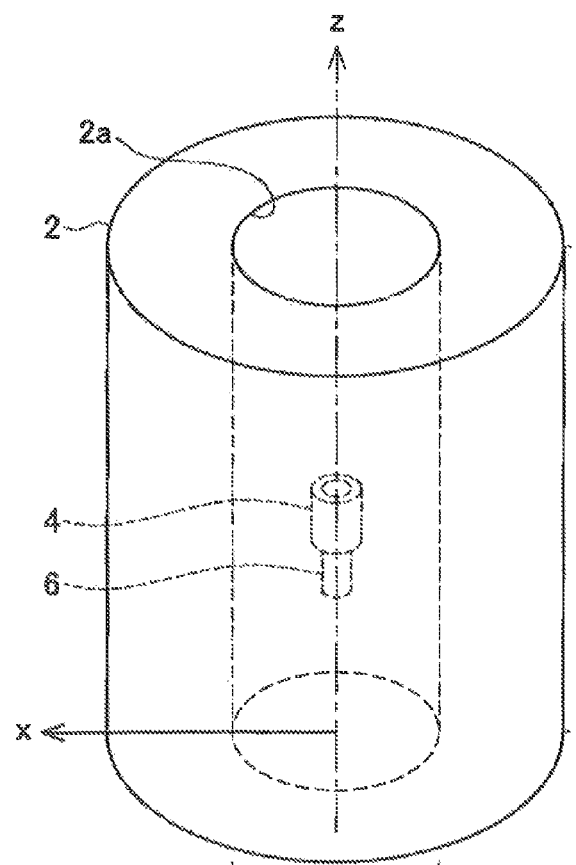
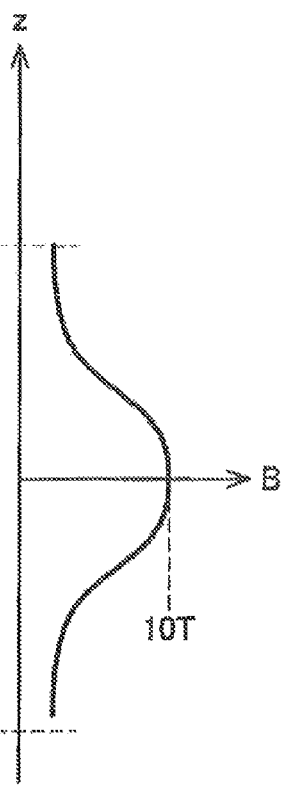
FIG. 4c
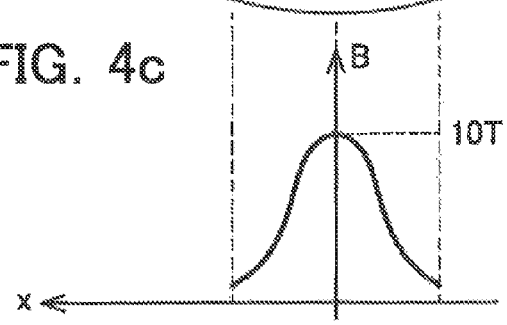

FIG. 6
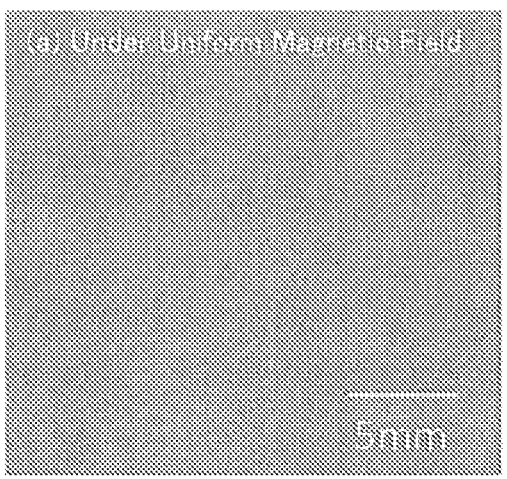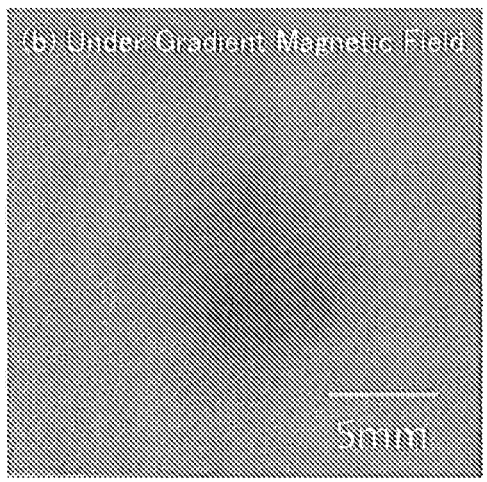

FIG. 7a
| Slurry | Immobilized by the Device in Fig.3 |
|---|---|
| Dy:FAP + UD:FAP | (Under Weak Magnetic Field) |
FIG. 7b
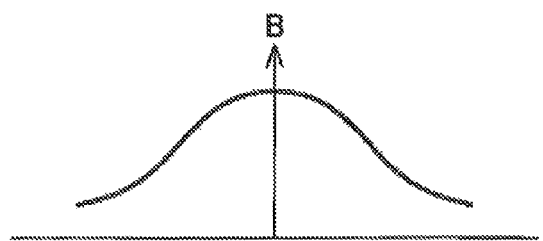
FIG. 7c
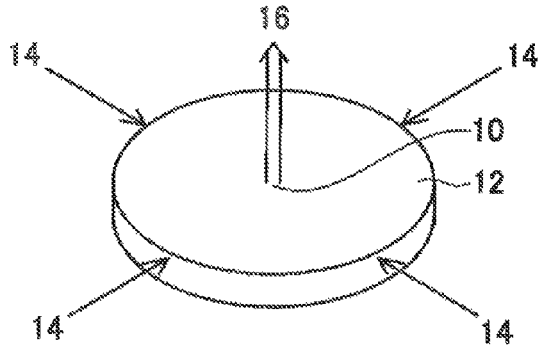

FIG. 9

| 1 | Nd:FAP |
| --- | --- |
| | YVO$_4$ |
| | RE:YAG |
| 2-1 | RE:YAG + UD:YAG (Weak Magnetic Field at Room Temperature) |
| | RE:Y$_2$O$_3$ + UD:Y$_2$O$_3$ |
| 2-2 | Dy:FAP + UD:FAP |
| 2-3-a | Dy:FAP + Nd:FAP |
| 2-3-b | Nd:FAP + UD:FAP |

TRANSLUCENT POLYCRYSTALLINE MATERIAL AND MANUFACTURING METHOD THEREOF

CROSS-REFERENCE TO RELATED APPLICATIONS

This application is a national phase application of International Application No. PCT/JP2012/050023, filed Jan. 4, 2012, and claims the priority of Japanese Application No. 2011-028685, filed Feb. 14, 2011, the content of both of which is incorporated herein by reference.

TECHNICAL FIELD

The present invention relates to a polycrystalline material and a manufacturing method thereof. More particularly, the present invention relates to a translucent polycrystalline material that can be used for an optical device and a manufacturing method thereof.

DESCRIPTION OF RELATED ART

Patent Document 1 and Patent Document 2 disclose a technique for manufacturing a translucent polycrystalline material from a plurality of single crystal grains. With such a technique, a slurry (suspension) including a group of single crystal grains, each single crystal grain having a magnetic anisotropy, is immobilized in a magnetic field and then sintered. As a result, an oriented polycrystalline material is obtained in which crystal orientations of the single crystal grains are aligned.

In the present specification, a phenomenon in which the crystal orientations of single crystal grains are aligned is called "orientation" or "oriented". Further, the process of fixing the positions and directions of single crystal grains contained in a slurry is called "immobilization". As long as a group of single crystal grains is suspended in a solvent such as water, the positions and directions of the single crystal grains contained in the slurry can vary, but when the solvent is removed, the positions and directions of the single crystal grains are immobilized.

In the present specification, the redundant description of matters described in Patent Document 1 and Patent Document 2 is omitted. The present specification has been prepared by using the contents described in Patent Document 1 and Patent Document 2 as a preamble.

CITATION LIST

Patent Literature

Patent Document 1: Japanese Patent Application Publication No. 2009-160760
Patent Document 2: WO 2010/073712 A1

The technique described in Patent Document 1 and Patent Document 2 is designed to obtain the oriented polycrystalline material in which crystal orientations of single crystal grains are aligned, and with this technique, the slurry is immobilized in a uniform magnetic field with a uniform magnetic flux density. An optical material with uniform optical properties can thus be obtained.

In some optical materials, optical properties vary (are distributed) within the material. For example, an optical fiber is constituted by a core and a cladding having different refractive indexes. A crystal material has also been suggested for laser oscillation in which a laser beam is oscillated with high efficiency by changing the composition of a core portion that oscillates the laser beam from the composition of a guide portion that guides excitation light to the core portion.

The technique described in Patent Document 1 and Patent Document 2 is not designed to manufacture a material with optical properties varying within the material. Where a material with optical properties varying within the material is manufactured, the conventional technique involves a manufacturing step for each region. When the material includes a plurality of regions with different optical properties, a plurality of manufacturing steps is required. With the conventional technique, the manufacturing steps are complex and the optical properties change discontinuously at the boundaries between the regions.

BRIEF SUMMARY OF INVENTION

The present invention provides a manufacturing method by which a plurality of regions with different optical properties can be manufactured at the same time. Further, a translucent polycrystalline material is provided in which optical properties vary continuously, rather than discontinuously.

The present specification discloses a method for manufacturing a translucent polycrystalline material in which optical properties vary inside the material. This manufacturing method includes a step of immobilizing a slurry, which includes a group of single crystal grains that are acted upon by a force when placed in a magnetic field, in a gradient magnetic field in which a magnetic flux density varies spatially, and a step of sintering the immobilized material. In the present specification, the magnetic field in which a magnetic flux density varies spatially is called a gradient magnetic field.

When the slurry, which includes a group of single crystal grains that are acted upon by a force when placed in a magnetic field, is immobilized in a gradient magnetic field, a material is obtained in which the composition, degree of orientation, or orientation direction of the group of single crystal grains differ depending on the immobilization position. Where such material is sintered, it is possible to manufacture a translucent polycrystalline material in which optical properties vary inside the material. The term "translucent" used in the present specification is not limited to transparent materials. Thus, a material is called "translucent", provided that light can pass therethrough, even if the light is scattered.

When single crystal grains having magnetic anisotropy are placed in a uniform magnetic field, the grains are not acted upon a translation force even when they are acted upon by a rotating force. By contrast, when the single crystal grains having magnetic anisotropy are placed in a gradient magnetic field, the grains are acted upon by both the translation force and rotating force. In a case of single crystal particles having no magnetic anisotropy, the rotating force does not act even in a magnetic field, but when such grains are placed in a gradient magnetic field, a translation force acts thereupon. With the technique described in the present specification, a variety of polycrystalline materials are manufactured by using the relationship between the gradient magnetic field and the orientation and intensity of the force generated in the gradient magnetic field.

It is preferred that a slurry be used that includes a group of single crystal grains doped with a rare earth element. For example, where a single crystal grain that is not acted upon by a force even when placed in a magnetic field is doped with a rare earth element, the grain is acted upon by a force from the magnetic field. A translucent polycrystalline material with optical properties that change in the material can be manufactured from a group of single crystal grains of a type that is not acted upon by a force even when placed in a magnetic field. Alternatively, where a rare earth element dopant is present, the force by which the magnetic field acts upon the grains is increased. Thus, the intensity of magnetic field used for immobilizing the slurry can be reduced.

In one embodiment, a slurry is used that includes a group of single crystal grains of a plurality of types that differ from each other in a translation force acting thereupon when the grains are placed in a gradient magnetic field.

The intensity of the translation force acting upon the single crystal grains when the grains are placed in the gradient magnetic field differs depending on the type of the single crystal grains. This intensity also differs depending on the amount of the rare earth element dopant in the single crystal grains and/or the type of the rare earth element dopant in the single crystal grains. Accordingly, for example, a group of single crystal grains of two types that differ in the amount of the rare earth element dopant in the single crystal grains are prepared. Alternatively, single crystal grains of two types that differ in the type of the rare earth element dopant in the single crystal grains are prepared. Alternatively, single crystal grains of different types doped with the same rare earth element in the same amount are prepared. The number of types may be any number equal to or greater than two.

When a slurry is used in which the grains acted upon by a strong translation force when placed in a gradient magnetic field are mixed with grains that are not acted upon by a strong translation force, a portion immobilized at a position where the magnetic field is strong includes a large number of grains acted upon by a strong translation force, and a portion immobilized at a position where the magnetic field is weak includes a small number of grains acted upon by a strong translation force. Thus, a translucent polycrystalline material in which the composition of single crystal grains varies depending on location can be obtained. For example, it is possible to obtain a translucent polycrystalline material combining a core portion that oscillates a laser beam and a guide portion that guides excitation light to the core portion. Alternatively, it is possible to obtain a translucent polycrystalline material combining a core and a cladding constituting an optical fiber. The cases in which the type of the rare earth element dopant in the single crystal grains differs depending on location, the amount of the rare earth element dopant in the single crystal grains differs depending on location, and base material of the single crystal grains differs depending on location can be together considered as a case in which the composition of the single crystal grains varies depending on location.

Since the immobilization is performed in a gradient magnetic field in which the magnetic flux density differs depending on location, it is possible to manufacture a polycrystalline material in which the degree of orientation differs depending on location even by using a slurry that contains single crystal grains of only one type. For example, it is possible to obtain a translucent polycrystalline material having a strongly oriented region together with a weakly oriented region (or non-oriented region) even if the material is formed by single crystal grains of one type. Such a polycrystalline material is also included in the technical scope disclosed in the present specification.

It is also possible to use a slurry including a group of single crystal grains of a plurality of types that differ from each other in a rotating force acting upon the grains when they are placed in a magnetic field. The intensity of the rotating force acting upon the single crystal grains when the grains are placed in a magnetic field differs depending on the type of the single crystal grains. The intensity of the rotating force also differs depending on the amount of the rare earth element dopant in the single crystal grains and/or the type of the rare earth element dopant in the single crystal grains. Accordingly, for example, a group of single crystal grains of two types that differ in the amount of the rare earth element dopant in the single crystal grains are prepared. Alternatively, single crystal grains of two types that differ in the type of the rare earth element dopant in the single crystal grains are prepared. Alternatively, single crystal grains of different types doped with the same rare earth element in the same amount are prepared. The number of types may be any number equal to or greater than two.

When a slurry is prepared by mixing the grains upon which a strong rotating force acts when the grains are placed in a magnetic field and the grains upon which the strong rotating force does not act, the group of the single crystal grains immobilized at a position where the strong magnetic field acts is strongly oriented, but the group of the single crystal grains immobilized at a position where the weak magnetic field acts is weakly oriented. In the case of an optically anisotropic material, the strongly oriented portion, that is, the region in which the crystal orientations are effectively aligned, becomes transparent, but the light is scattered in the weakly oriented portion, that is, the region where the crystal orientations are not aligned. It is thus possible to manufacture a translucent polycrystalline material having a transparent region together with a scattering region. Anisotropy is sometimes demonstrated as a result of excitation even in materials that are optically isotropic. In some cases a translucent polycrystalline material is needed in which a region with the aligned crystal orientations is present in combination with a region in which the crystal orientations are not aligned, even if such a material is optically isotropic. Further, even optically isotropic materials sometimes have magnetic anisotropy. Alternatively, a material, that is optically and magnetically isotropic can demonstrate magnetic anisotropy when doped with a rare earth element or the like. By using a gradient magnetic field, it is possible to create the distribution of the degree of orientation in an optically isotropic polycrystalline material.

In the strongly oriented region and weakly oriented region, the composition of the single crystal grains may be same or different. There is a case that a translucent polycrystalline material in which the composition is the same, but the degree of orientation varies depending on location is useful. On the other hand, there is a case that a translucent polycrystalline material in which both the composition and the degree of orientation vary depending on location is useful.

In a region with a strongly oriented optically anisotropic single crystal group, a transparent body with small optical scattering is obtained, whereas in a region with a weakly oriented optically anisotropic single crystal group or a region in which optically anisotropic single crystal group is not oriented, a translucent body with large optical scattering is obtained. In the latter case, a linear transmissivity is decreased due to a birefringence. Where the strongly oriented region and the weakly oriented region can be included in the same translucent polycrystalline material, the below-descried control is possible, and an optical device using such control can be fabricated.

(1) Oscillation region control: for example, an oriented region and a non-oriented region are created in a laser medium in different positions. In this case, it is possible to oscillate a laser beam in the oriented region and not to oscillate a laser beam in the non-oriented region. Thus, a plurality of oscillation spots can be formed in the same laser medium and the beam mode can be controlled to a Laguerre-Gaussian mode. Where a structure inhibiting parasitic oscillations is to be obtained, the excitation light power incident on the laser medium can be used more efficiently than in the conventional laser medium, and the output of a microchip laser device that will be described hereinbelow with reference to FIG. 8 can be increased.

(2) Excitation light control: a surface area irradiated with the excitation light, an intensity distribution of the excitation light, and a path of the excitation light can be controlled by intentionally introducing the excitation light into the non-oriented region and scattering the light.

A useful translucent polycrystalline material can be also obtained by introducing a region in which optically isotropic single crystals are strongly oriented and a region in which the same single crystals are weakly oriented.

Where the optically isotropic single crystals are strongly excited, thermal birefringence occurs due to a photoelastic effect. The degree of the thermal birefringence is axially dependent even in isotropic crystals and, therefore, becomes a cause of optical anisotropy. In the oriented region, this phenomenon is demonstrated only with respect to a specific axis and, therefore, the birefringence can be compensated. By contrast, in the non-oriented region, the birefringence cannot be compensated because the crystal orientations are random. As a result, in a strongly excited state, the amount of loss can be controlled by controlling the degree of orientation even in the isotropic single crystals in the same manner as in anisotropic materials. For example, a low-loss state can be realized in the oriented region, and a high-loss state can be realized in the non-oriented region. The above-described (1) oscillation region control and (2) excitation light control can be realized even in the case where an optically isotropic crystal of cubic-system is used.

It is also effective to use a slurry including a group of single crystal grains of a plurality of types that differ from each other in a crystal orientation that is stable when the grains are placed in a magnetic field.

In this case, for example, it is possible to manufacture a translucent polycrystalline material including a combination of a region oriented in the thickness direction and a region oriented in a direction perpendicular to the thickness direction. Where a translucent polycrystalline material is obtained in which the orientation direction differs depending on location, the wavelength can be stabilized and a band can be narrowed by refractive index modulation. Further, a micro-resonator function can be also realized by using the difference in refractive index. A ceramic VBG element can be also realized.

With the technique described in the present specification, it is possible to obtain a translucent polycrystalline material with optical properties varying continuously within the material.

Since the magnetic field intensity does not vary spatially discontinuously, the technique described in the present specification makes it possible to obtain a translucent polycrystalline material with optical properties varying continuously within the material. Even if the immobilization is performed in a magnetic field with a continuously varying intensity, since a material can be provided with a type having a threshold, the technique described in the present specification, in some cases, also produces a translucent polycrystalline material with optical properties varying discontinuously within the material. The manufacturing method described in the present speciation can be also used to manufacture a material with discontinuously varying optical properties and is not limited to manufacturing a material with continuously varying optical properties. However, the translucent polycrystalline material with optical properties varying continuously in the material has been the first to be realized with the technique described in the present specification.

The translucent polycrystalline material of one aspect includes a group of single crystal grains of a plurality of types, and the composition of the single crystal grains varies continuously in the material. Where a slurry including a group of single crystal grains of a plurality of types that differ in the translation force acting upon the grains when the grains are placed in a gradient magnetic field is immobilized in the gradient magnetic field, it is possible to obtain a translucent polycrystalline material in which the composition of the single crystal grains varies continuously in the material.

By using such a technique, it is possible to obtain a translucent polycrystalline material with a composition varying according to location. For example, it is possible to obtain a translucent polycrystalline material having a combination of a core portion that is formed from a material doped with a light-emitting center substance and, therefore, oscillates a laser beam and a guide portion that is formed from a material undoped with a light-emitting center substance and, therefore, does not oscillate a laser beam, but instead guides the excitation light to the core portion. Alternatively, by controlling the spatial distribution of the concentration of a rare earth element dopant in the substance, it is possible to form an excitation energy distribution matching the desired laser beam profile. For example, it is possible to manufacture a translucent polycrystalline material in which the concentration of a rare earth element takes a maximum in the central section (beam center section) of the laser medium, or a multi-spot oscillation laser medium in which a plurality of light-emitting spots is formed in the same laser medium.

A translucent polycrystalline material in which the degree of orientation of the group of single crystal grains varies continuously in the material also demonstrates utility. There is a case that a material in which the degree of orientation varies despite a uniform composition demonstrates utility, on the other hand, there is a case that a material in which both the composition and the degree of orientation vary demonstrate utility.

For example, an oscillation region can be controlled by controlling the excitation light by using light scattering in the non-oriented region (aperture function). Since anisotropy is demonstrated due to a photoelastic effect in a strongly excited state even when optically isotropic single crystals are used, varying the degree of orientation according to location is meaningful. By using optically isotropic single crystals, it is possible to control the intensity distribution of the excitation light or to control the oscillation region.

A translucent polycrystalline material in which the orientation directions of single crystal gains vary continuously also demonstrates utility.

Where a translucent polycrystalline material is obtained in which the orientation direction differs depending on location, the wavelength can be stabilized and a transition to a narrow band can be made by refractive index modulation. Further, a micro-resonator function can be also realized by using the difference in refractive index. A ceramic VBG element can be also realized.

"A translucent polycrystalline material in which the composition of single crystal grains varies continuously in the material and the degree of orientations of single crystal grains varies continuously in the material", "a translucent polycrystalline material in which the composition of single crystal grains varies continuously in the material and the orientation directions of single crystal grains vary continuously in the material", and "a translucent polycrystalline material in which the composition of single crystal grains varies continuously in the material, whereas the orientation directions of single crystal grains are aligned" can also demonstrate utility.

For example, it is possible to control a laser beam path by attenuating the light making no contribution to oscillations, to dope with two or more rare earth elements that differ in the oscillation wavelength, to realize a patterning that exhibits parasitic oscillations, and to realize a laser medium having a plurality of resonators in a single medium.

With the technique disclosed in the present specification, it is possible to provide a material with optical properties varying continuously in the material. For example, a laser oscillation material with increased oscillation efficiency can be provided. Further, a process for manufacturing the material with optical properties varying continuously or discontinuously in the material is simplified.

BRIEF DESCRIPTION OF DRAWINGS

FIG. 2 shows the obtained polycrystalline material in comparison with the group of single crystal grains included in a slurry.

FIG. 3 shows a device for use in a slurry immobilization process.

FIG. 4 shows another device for use in a slurry immobilization process. FIG. 4a shows the device, FIG. 4b shows magnetic flux density distribution along z-axis, and FIG. 4c shows magnetic flux density distribution along x-axis.

FIG. 6 shows the group of single crystal grains immobilized in a gradient magnetic field in comparison with the group of single crystal grains immobilized in a uniform magnetic field. FIG. 6a shows the single crystal grains immobilized in a uniform magnetic field, and FIG. 6b shows the single crystal grains immobilized in a gradient magnetic field.

FIG. 7a shows the type of slurry used in the examples, FIG. 7b shows the gradient magnetic field distribution, and FIG. 7c shows the obtained polycrystalline material.

FIG. 9 shows a single crystal included in a slurry of the examples.

FIG. 10 shows the rare earth elements arranged in the order of increasing magnetization ratio obtained by doping therewith.

DETAILED DESCRIPTION OF INVENTION

Figure 1:
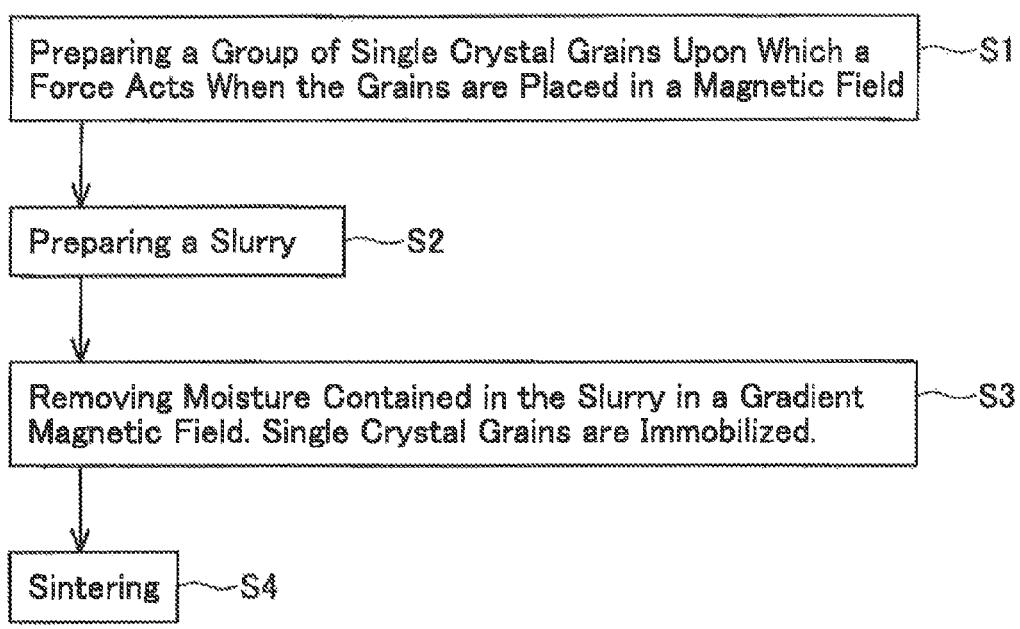
FIG. 1 shows a process for manufacturing a translucent polycrystalline material.

The present invention can be implemented in a variety of the following aspects.

(Aspect 1) Magnetic anisotropy is obtained by doping an optically isotropic single crystal of cubic system or the like with a rare earth element.

(Aspect 2) Magnetic anisotropy of an anisotropic crystal of hexagonal system or the like is used.

(Aspect 3) Magnetic anisotropy is used that is greatly increased by doping an anisotropic single crystal of hexagonal system or the like with a rare earth element.

(Aspect 4) A slurry including the single crystal grains of only one type is used.

(Aspect 5) Where a slurry including the single crystal grains of only one type is immobilized in a gradient magnetic field, the orientation state changes according to the level of magnetic flux density. For example, it is possible to obtain a material in which in a region with a high magnetic flux density, crystal orientations of the single crystal grains are aligned effectively, and in a region with a low magnetic flux density, random crystal orientations of the single crystal grains are obtained. Where the alignment degree of crystal orientations is taken as a degree of orientation, a material with the degree of orientation varying in the material can be obtained.

(Aspect 6) A material in which the degree of orientation of anisotropic single crystals of a tetragonal system or hexagonal system varies depending on a position can be used as an optical material in which light propagates linearly at a position with a high degree of orientation, whereas at a position with a low degree of orientation, the light is scattered. An optical material with a controlled shape of laser oscillation region can be realized.

(Aspect 7) Magnetic anisotropy can be demonstrated by doping an isotropic single crystal such as that of a cubic system with a rare earth element. By performing the immobilization in a gradient magnetic field, it is possible to obtain an optical material in which a portion with aligned crystal orientations and a portion with random crystal orientations are copresent. In the portion with aligned crystal orientations, the birefringence effect can be compensated, whereas in the portion with random crystal orientations, the birefringence effect cannot be compensated. Therefore, it is possible to realize an optical material in which a region in which the light propagates linearly and a region in which the light is scattered during laser oscillation are copresent.

(Aspect 8) A magnetic field with a spatially varying magnetic flux density can be realized by a variety of methods. For example, where a magnetic field is generated by using a magnet (permanent magnet or electromagnet) or a ferromagnetic body that is small by comparison with the slurry immobilization space, a gradient magnetic field with a varying magnetic flux density can be created inside the slurry immobilization space. By adjusting the arrangement position of the magnet and the shape thereof, it is possible to realize gradient magnetic fields having spatial distributions of various shapes. Where a plurality of magnets are disposed in a dispersed manner, gradient magnetic fields having spatial distributions of various shapes can be realized by adjusting a magnetomotive force of each magnet.

EXAMPLES

FIG. 1 shows a manufacturing process common to the below-described examples.

Step 1: A group of single crystal grains is prepared. In this case, a group of single crystal grains is prepared such that are acted upon by a force (rotating force or a translation force) when placed in a magnetic field. The following crystal grains can be used as the grains acted upon by a force when placed in a magnetic field.

(1) Crystals obtained by doping optically isotropic crystals of a cubic system or the like with a rare earth element.

(2) Optically anisotropic crystals of a tetragonal system or hexagonal system.

(3) Crystals obtained by doping optically anisotropic crystals of a tetragonal system or hexagonal system with a rare earth element.

A method for preparing single crystal grains doped with a rare earth material is not particularly limited. For example, a group of single crystal grains doped with a rare earth element can be prepared by a wet synthesis method or a solid-phase reaction using preliminary mixing or pre-baking. For example, a group of single crystal grains doped with a rare earth element can be prepared by synthesizing powders.

Alternatively, a group of single crystal grains doped with a rare earth element can be also prepared by treating a commercially available group of single crystal grains.

Step 2: a slurry is prepared. Single crystal grains of one type may be suspended, or single crystal grains of two or more types may be suspended. Where the single crystal grains suspended in the slurry are acted upon by a translation force, the grains are moved, and where the grains are acted upon by a rotating force, the crystal orientation is rotated. The types of solvents and dispersants used for suspending the crystal grains and the concentration of the dispersant are not particularly limited and can be selected, as appropriate, according to the state of the starting material powder.

Step 3: for example, the slurry is poured into a gypsum mold, and the gypsum mold is placed in a gradient magnetic field with a magnetic flux density varying depending on location. Moisture contained in the slurry is absorbed by the gypsum mold, and the group of single crystal grains contained in the slurry is immobilized. The slurry can be immobilized by slip casting or the like. The composition, degree of orientation, and orientation direction of the immobilized single crystal grains vary depending on the intensity of the magnetic field applied during the immobilization.

Step 4: the material obtained in Step 3 is sintered. As a result, a translucent polycrystalline material with optical properties varying in the material is obtained.

The examples explained hereinbelow can be divided in the cases such as illustrated by FIG. 2.

Case 1: the slurry includes single crystal grains of one type having magnetic anisotropy (a rotating force acts).

Case 2: the slurry includes single crystal grains acted upon by a translation force and single crystal grains that are not acted upon by a translation force. The single crystal grains that are not acted upon by a translation force, as referred to herein, are inclusive of single crystal grains acted upon only by a weak translation force. The slurry may also include single crystal grains of three or more types that differ in the size of the translation force. Case 2 can be further subdivided.

Case 2-1: neither type of single crystal grains has magnetic anisotropy (a rotating force does not act). The single crystal grains having no magnetic anisotropy, as referred to herein, are also inclusive of single crystal grains that demonstrate only weak magnetic anisotropy.

Case 2-2: the single crystal grains acted upon by a translation force have magnetic anisotropy (rotating force acts), and single crystal grains that are not acted upon by a translation force do not have magnetic anisotropy (a rotating force does not act).

Case 2-3: both types of single crystal grains have magnetic anisotropy (a rotating force acts). Case 2-3 can be further subdivided.

Case 2-3-$a$: axes of easy magnetization coincide.

Case 2-3-$b$: axes of easy magnetization are different.

First Embodiment

This embodiment corresponds to Case 1. The slurry was immobilized in a gradient magnetic field with a spatially varying magnetic field intensity, and a translucent polycrystalline material having a uniform composition and an non-uniform distribution of degree of orientation in the material was manufactured.
<Single Crystals Used>

Nd:FAP (Nd added fluoroapatite represented by the chemical formula $Nd:Ca_5(PO_4)_3F$) was used. Nd:FAP is of a hexagonal crystal system, has optical and magnetic anisotropy, and is acted upon by a rotating force when placed in a magnetic field. The crystals are acted upon by a rotating force when placed in a magnetic field even without doping with Nd, but doping with Nd increases the rotating force acting upon the crystals in the magnetic field. A group of single crystals of commercial FAP was used to prepare the Nd:FAP. Since the purchased group of single crystals of FAP formed an aggregate, it was ground in a mortar and then doped with Nd.
<Preparation of Slurry>

A slurry was prepared by adding 9 ml of water and 1 ml of a dispersant (Aqualic™, manufactured by Nippon Shokubai Co., Ltd.) to 3 g of a group of single crystals of Nd:FAP.
<Immobilization>

Figure 3A:
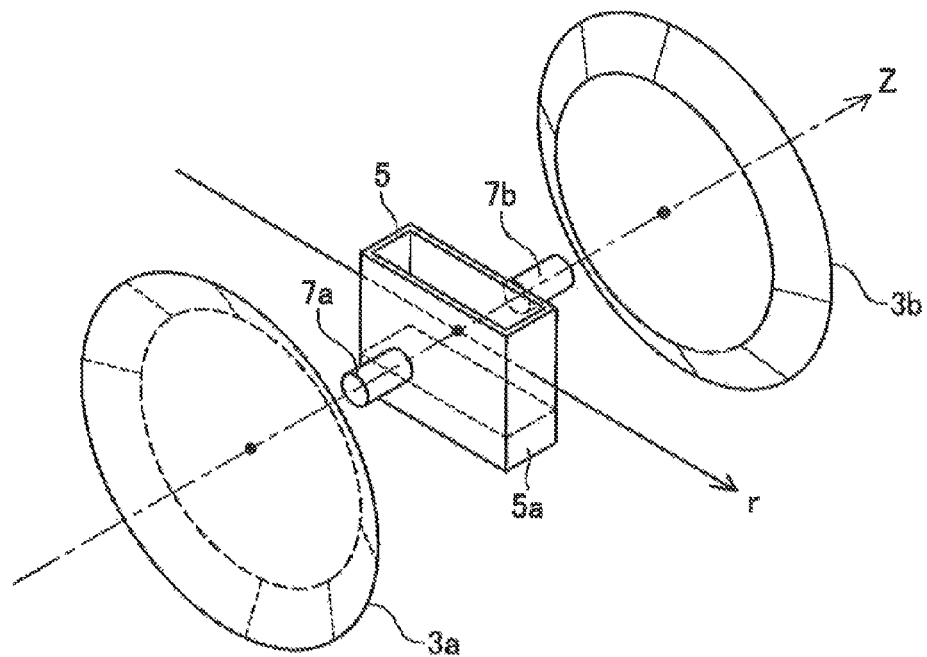
FIG. 3a shows the device.
Figure 3B:
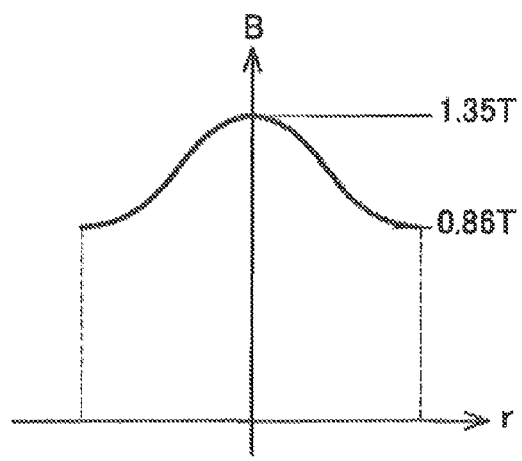
FIG. 3b shows magnetic flux density distribution along r-axis.

As shown in FIG. 3$a$, the slurry was poured into a gypsum mold 5 in the form of a rectangular parallelepiped, and moisture contained in the slurry was absorbed by the gypsum mold 5, thereby immobilizing the positions and orientations of the single crystal grains contained in the slurry. A bottom plate 5$a$ of the gypsum mold 5 was made thick to absorb water.
<Magnetic Field in Which Immobilization Proceeded>

As shown in FIG. 3$a$, the gypsum mold 5 with a slurry to be immobilized was placed in a magnetic field between a pair of electromagnets 3$a$, 3$b$ in which a magnetic flux extended in the horizontal direction. The gypsum mold 5 was placed for immobilization on a z-axis passing through the centers of the pair of electromagnets 3$a$, 3$b$. The reference symbols 7$a$, 7$b$ in the figure denote permanent magnet placed on the z-axis. Under the effect of the permanent magnets 7$a$, 7$b$ placed on the z-axis, the magnetic field of the electromagnets 3$a$, 3$b$ is distorted. The magnetic flux density measured along a r-axis perpendicular to the z-axis is shown in FIG. 3$b$. The magnetic field has a high intensity on the z-axis, and the intensity decreases as a side wall of the gypsum mold 5 is approached. As shown in FIG. 3$b$, the magnetic flux density of the z-axis (r=0) was 1.35 T (Tesla), and the magnetic flux density at a position in contact with the side wall of the gypsum mold 5 was 0.86 T (Tesla). The magnetic flux density thus decreased to 64% of the maximum value. The slurry was immobilized by placing the gypsum mold 5 under a temperature of 296 K.
<Orientation State of Immobilized Group of Single Crystal Grains>

The axis of easy magnetization of Nd:FAP is a c-axis. Therefore, where the immobilization is performed in a magnetic field, the immobilization easily proceeds in a posture in which the c-axis of the crystals is along the magnetic flux lines. The degree of orientation corresponds to the magnetic flux density. The group of single crystal grains of Nd:FAP immobilized at a position with a strong magnetic field is readily oriented, whereas the degree of orientation of the single crystal grains of Nd:FAP immobilized at a position with a weak magnetic field is low. As a result, single crystal grains with a high degree of orientation are obtained at the central axis of the gypsum mold 5, whereas single crystal grains with a low degree of orientation are obtained closer to the walls of the gypsum mold 5. Where the single crystal grains of Nd:FAP are sintered, the degree of orientation of the sintered body is increased by the preferential growth between the oriented grains. The difference in the degree of orientation created by the immobilization is augmented. As a result, after the sintering, a polycrystal with a high degree of orientation is obtained from the group of single crystal grains present on the central axis of the gypsum mold 5, and a polycrystal with a low degree of orientation is obtained from the group of single crystal grains located at positions close to the walls of the gypsum mold 5. The polycrystal with a high degree of orientation has a high linear transmissivity and the so-called translucency thereof is high. The polycrystal with a low degree of orientation has a low linear transmissivity and easily scatters light while still being translucent. By compression sintering the bulk body of the polycrystalline material obtained in the first example, it is possible to obtain a transparent polycrystal with a high transparency in the center in which light scattering is intensified as the material periphery is approached.

<Treatment of Immobilized Group of Single Crystal Grains>

The explanation above relates to a state after sintering, but the following operations were actually performed before and during the sintering. A molded body obtained by immobilizing the group of single crystal grains in the gypsum mold 5 was taken out of the gypsum mold 5 and naturally dried for 24 h at room temperature to obtain a molded body with a height of 25 mm, a width of 5 mm, and a thickness of 2 mm.

<Primary Sintering>

The obtained molded body was sintered for 1 h under an air atmosphere. The heating temperature was 1873 K. The relative density of the primary sintered body was equal to or higher than 90%.

<Obtained Polycrystalline Material>

The degree of orientation of the surface of the obtained sample was evaluated by a powder X-ray diffractometer. The surface parallel to the magnetic field application direction was irradiated with X-rays. The diffraction intensity ratio (300)/002) of an a-plane and a c-plane of the portion to which a strong magnetic field was applied was 29.3, the same diffraction ratio of the portion to which a weak magnetic field was applied was 9.88. The same diffraction intensity ratio of powdered FAP was 2.41. Therefore, the sample of the present example had a uniaxial orientation tendency in the entire region, but the degree of orientation in the region to which a strong magnetic field was applied was high, whereas the randomness of orientation was relatively increased in the region to which a weak magnetic field was applied.

<Secondary Sintering>

A translucent polycrystalline material can be obtained by hot isostatic pressing (HIP) treatment, in which the primary sintered body is not sealed in a capsule (capsule-free treatment) and the primary sintered body is sintered for 1 h under argon atmosphere pressurized to 196 MPa at a heating temperature of 1873 K. The secondary sintering is described in detail in Patent Document 2.

<Application of Translucent Polycrystalline Material>

The method of the first example makes it possible to obtain a translucent polycrystal with a high linear transmissivity in the center and a high scattering ratio at the periphery. For example, an optical filter can be obtained.

The position in which the transparent region is present can be adjusted by adjusting the placement position of the permanent magnets 7a, 7b. The shape of the transparent region can be patterned by adjusting the shape of the permanent magnets 7a, 7b. The distribution curve of linear transmissivity can be adjusted by adjusting the intensity ratio of the magnetic flux density of the external magnets (electromagnets 3a, 3b) and the magnetic flux density of the inner magnets (permanent magnets 7a, 7b). Optical filters of various patterns can be realized.

Variation Example 1 of the First Embodiment

Since FAP has magnetic anisotropy, doping with a rare earth element may be avoided. However, doping with a rare earth element greatly increases the magnetic anisotropy. Therefore, the distribution of the degree of orientation can be formed even when the variation width of the magnetic flux density used for the immobilization is reduced.

In a case where a rotating force acting upon the single crystal grains is weak and no orientation occurs unless a strong magnetic field is applied, it is possible to use a magnetic field application device shown in FIG. 4. In FIG. 4, the reference numeral 2 stands for a superconductive magnet, 6 stands for a permanent magnet, and 4 stands for a gypsum mold. A gradient magnetic field of a high intensity can be realized at the arrangement position of the gypsum mold 4 by the superconductive magnet 2 and the permanent magnet 6.

The axis of easy magnetization becomes the c-axis when FAP is doped with at least one species selected from the group including cerium (Ce), praseodymium (Pr), terbium (Tb), dysprosium (Dy), and holmium (Ho). Therefore, the immobilization process shown in FIG. 3 or FIG. 4 is used.

In this case, a rare-earth-doped FAP polycrystal is obtained in which the transparency is high in the center and the light is more likely to be scattered as the periphery is approached. Since the transparent central section includes rare earth atoms serving as emission centers, this section becomes the laser oscillation region. Since the light is easily scattered in the peripheral section, this section does not become the laser oscillation region. However, because this section is translucent, it serves as an excitation light guide. The excitation light can be controlled using the excitation light guide. For example, by intentionally causing the excitation light to fall onto a nonoriented region and be scattered therein, it is possible to control the surface area irradiated by the excitation light, intensity distribution of the excitation light, and path thereof. For example, where a structure inhibiting parasitic oscillations is to be obtained, the excitation light power incident on the laser medium can be used more efficiently than in the conventional laser medium, and the output of a microchip laser device or the like can be increased.

Variation Example 2 of the First Embodiment

The axis of easy magnetization becomes the a-axis when FAP is doped with at least one species selected from the group including promethium (Pm), samarium (Sm), erbium (Er), thulium (Tm), and ytterbium (Yb). In this case, the immobilization process shown in FIG. 5 is used.

Figure 5:
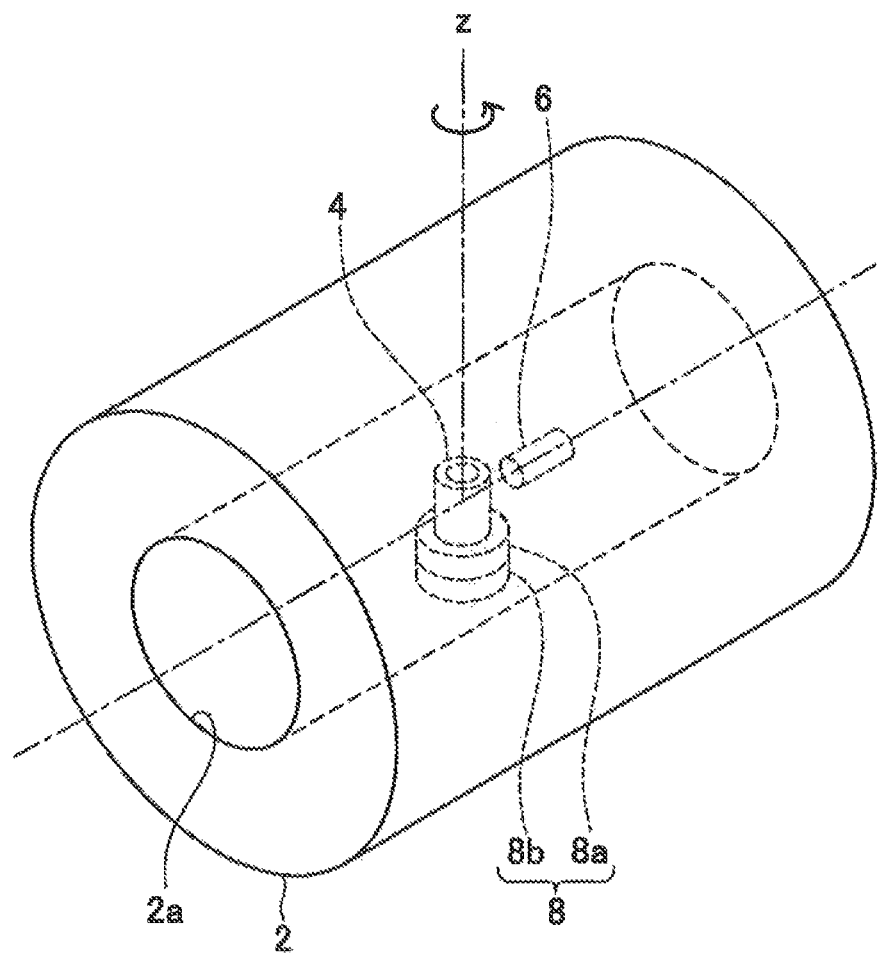
FIG. 5 shows yet another device for use in a slurry immobilization process.

As shown in FIG. 5, when the single crystal grains for which the axis of easy magnetization is the a-axis are immobilized, the magnetic field space 2a of the superconductive magnet 2 is placed horizontally. A turntable 8 is placed in the magnetic field space 2a, and the gypsum mold 4 is placed thereupon. In the turntable 8, an upper plate 8a rotates about the z-axis with respect to a lower plate 8b fixed in the magnetic field space 2a. Therefore, the gypsum mold 4 also rotates about the z-axis. The permanent magnet 6 is fixed in the magnetic field space 2a. In this case, the slurry located inside the gypsum mold 4 is immobilized in a state in which the slurry is placed in a rotating magnetic field. Where the single crystal grains for which the axis of easy magnetization is the a-axis are immobilized in a magnetic field rotating in a horizontal plate, the c-axes are immobilized along the z-axis. In this case, the positions close to the rotation center of the gypsum mold 4 are exposed to a high-intensity magnetic field at all times, and the positions close to the walls of the gypsum mold 4 are mainly exposed to a low-intensity magnetic field. As a result, in the group of single crystal grains located at the positions close to the rotation center of the gypsum mold 4, the c-axes are effectively aligned in the z-axis direction and the group is made transparent by sintering. By contrast, most of the c-axes of the group of single crystal grains located at the positions close to the wall of the gypsum mold 4 deviate from the z-axis direction, the degree of orientation decreases, and light scattering increases.

Variation Example 3 of the First Embodiment

As shown in FIG. 9, $YVO_4$ (yttrium orthovanadate having a vanadate-type crystal structure) may be used instead of FAP. The axis of easy magnetization becomes the a-axis when $YVO_4$ is doped with at least one species selected from the group including cerium (Ce), praseodymium (Pr), neodymium (Nd), terbium (Tb), dysprosium (Dy), and holmium (Ho). Therefore, the immobilization process shown in FIG. 5 is used. The axis of easy magnetization becomes the c-axis when $YVO_4$ is doped with at least one species selected from the group including promethium (Pm), samarium (Sm), erbium (Er), thulium (Tm), and ytterbium (Yb). In this case, the immobilization process shown in FIG. 3 or 4 is used.

The axis of easy magnetization of an apatite-type single crystal doped with at least one species selected from the group including cerium (Ce), praseodymium (Pr), neodymium (Nd), terbium (Tb), dysprosium (Dy), and holmium (Ho) is typically the c-axis. In this case, the device shown in FIG. 3 or 4 that applies a static magnetic field is used. The axis of easy magnetization of a vanadate-type single crystal doped with at least one species selected from the group including promethium (Pm), samarium (Sm), erbium (Er), thulium (Tm), and ytterbium (Yb) is also the c-axis, and the device shown in FIG. 3 or 4 is used.

By contrast, the axis of easy magnetization of an apatite-type single crystal doped with at least one species selected from the group including promethium (Pm), samarium (Sm), erbium (Er), thulium (Tm), and ytterbium (Yb) is the a-axis, and in this case the slurry is immobilized while applying a rotating magnetic field by using the device shown in FIG. 5. The axis of easy magnetization of a vanadate-type single crystal doped with at least one species selected from the group including cerium (Ce), praseodymium (Pr), neodymium (Nd), terbium (Tb), dysprosium (Dy), and holmium (Ho) is also the a-axis, and the device shown in FIG. 5 is used.

Variation Example 4 of the First Embodiment

As shown in FIG. 9, YAG doped with a rare earth element may be used instead of FAP and $YVO_4$. YAG does not have magnetic anisotropy. However, it becomes anisotropic when doped with a rare earth element. Upon strong excitation, thermal birefringence occurs due to a photoelastic effect even in the isotropic YAG. The degree of the thermal birefringence is axis dependent even in the isotropic crystals. The birefringence can be compensated in the oriented region of YAG. The birefringence cannot be compensated in the nonoriented region of YAG. In a state with strong excitation even isotropic crystals have optical properties that differ depending on the degree of orientation. Where such a feature is used, it is possible to realize a low-loss state in the oriented region and a high-loss state in the nonoriented region. The above-described (1) oscillation region control and (2) excitation light control can be also performed when an optically isotropic cubic material is used.

Second Embodiment

This example corresponds to Case 2-1. The slurry was immobilized in a magnetic field with a spatially varying intensity and the orientation state was uniform (uniformly nonoriented state), but a translucent polycrystalline material with a composition varying in the material was manufactured.

<Magnetic Field in which Immobilization Proceeded

As shown in FIG. 4, the gypsum mold 4 with a slurry to be immobilized was plated in the magnetic field space 2a of the cylindrical superconductive magnet 2. The magnetic flux in the magnetic field space 2a was essentially along the longitudinal direction of the magnetic field space 2a. The gypsum mold 4 was placed in the central axis (z-axis) of the magnetic field space 2a and at a central position in the z-axis direction. The magnetic flux density distribution at a maximum output of the present device that was measured along the z-axis is shown in FIG. 4b. The length of the superconductive magnet 6 in the z-axis direction is 860 mm, and the variations in the magnetic flux density along the z-axis are small in the vicinity (about 50 mm) of the central position. The reference symbol 6 in the figure stands for a permanent magnet placed on the central axis of the magnetic field space 2a. The magnetic field of the superconductive magnet 2 is distorted under the effect of the permanent magnet 6 placed on the central axis, and, as shown in FIG. 4c, a strong magnetic field is obtained on the central axis and the magnetic field becomes weaker as the wall of the magnetic field space 2a is approached. In the present example, the magnetic flux density on the central axis of the gypsum mold 4 was set to 1.6 T (Tesla). The slurry was immobilized by placing the gypsum mold 4 under a temperature of 296 K. The device shown in FIG. 4 has an ability to increase the magnetic flux density on the central axis of the gypsum mold 4 up to 10 T.

<Single Crystals Used>

A slurry including a group of single crystal grains of Er-doped YAG and a group of single crystal grains of Er-undoped YAG was used.

The single crystal grains of Er-undoped YAG do not have magnetic anisotropy. Further, the magnetization ratio thereof is low and such grains are acted upon by a small translation force when placed in a gradient magnetic field.

The single crystal grains of Er-doped YAG have magnetic anisotropy. However, the magnetic anisotropy is manifested at a low temperature and is small at room temperature or in a low-intensity magnetic field. Therefore, no rotation torque acts upon the grains. Meanwhile, the magnetization ratio is high, and when the grains are placed in a gradient magnetic field, the translation force acting thereupon is strong. A translation force acts upon the grains at room temperature and in a low-intensity magnetic field.

<Immobilization>

A slurry including a group of single crystal grains of two types (Er:YAG (Er-doped YAG) and UD:YAG (YAG undoped with rare earth elements)) was immobilized in the device shown in FIG. 4. The single crystal grains of Er-doped YAG which was acted upon by a strong translation force moved preferentially to the region with a high magnetic flux density, and a composition with a high presence ratio of Er-doped YAG was obtained. As a result, in the region with a low magnetic flux density, a composition with a high presence ratio of Er-undoped YAG was obtained. As for crystal orientation, a uniform nonoriented state was obtained.

In FIG. 6, the group of single crystal grains obtained by immobilizing the slurry including Er:YAG grains and Er-undoped YAG grains in a uniform magnetic field is compared with the group of single crystal grains immobilized in a gradient magnetic field. In the test, the slurry including the group of Er:YAG grains and Er-undoped YAG grains was placed in an acrylic container in the form of a rectangular parallelepiped, the container was disposed in a magnetic field, and then taken out of the magnetic field. The images were picked up from the rear side under light irradiation. In a zone with a large concentration of Er:YAG grains, the light transmissivity is low and the image is, therefore, dark. In a zone with a low accumulation density of Er:YAG grains, the light transmissivity is high and the image is, therefore, light. The photo on the right side (FIG. 6(b)) was obtained in the case in which a gradient magnetic field with a maximum density close to the center was applied. The dark center suggests that the accumulation density of the Er:YAG grains in the center is high. By contrast, a light periphery indicates a low accumulation density of Er:YAG grains. The photo on the left side (FIG. 6(a)) was obtained in the case in which the immobilization proceeded in a uniform magnetic field. The Er:YAG grains are immobilized in a uniformly distributed state. As shown in the photo on the right side, the single crystal grains acted upon by a large translate force are confirmed to be preferentially accumulated in a region with a large magnetic flux density.

<Obtained Polycrystalline Material>

A disk with a diameter of 18 mm and a thickness of 1 mm was obtained after the immobilization. The composition distribution was such that the center was rich in Er-doped YAG, whereas the periphery was rich in Er-undoped YAG. The crystal orientation was in a uniform nonoriented state, but since the YAG was isotropic, a transparent polycrystal could be obtained by sintering.

Figure 8:
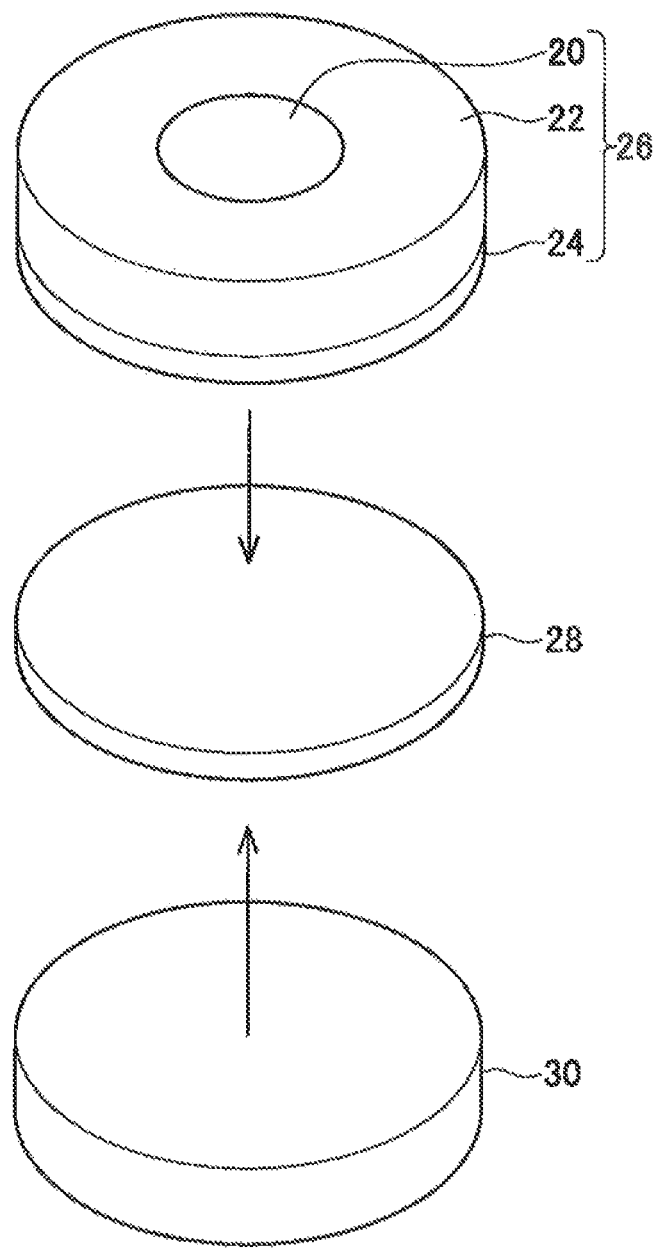
FIG. 8 is an exploded view of a laser oscillation device having a core and an excitation light guide.

FIG. 8 shows a laser generator disclosed in WO 2005/091447. The laser generator disclosed in this specification has a structure in which, as shown in FIG. 8, a disk 26 constituted by a central core 20 and an excitation light guide 22 wound therearound and a water-cooled heat sink 30 are joined by a high-thermal-conductivity joining layer 28. A high-reflective film 24 for a laser beam is formed on the lower surface of the disk 26.

The core 20 is formed from YAG doped with rare earth elements (ions). The rare earth ions serve as emission centers and oscillate the laser beam. The excitation light guide 22 is formed from YAG undoped with rare earth elements. Since no emission centers are present, the laser beam is not oscillated. Instead, the excitation light emitted from an outer side of the excitation light guide 22 is guided to the core 20.

The laser generator shown in FIG. 8 has a high laser beam generation efficiency and can be efficiently cooled. It is a compact solid-state laser device operating with high brightness, output, and efficiency.

WO 2005/091447 describes the technique for manufacturing the disk 26 in which the process for manufacturing the core 20 and the process for manufacturing the excitation light guide 22 are performed sequentially. With the technique of the above-described second embodiment of the present application, the process for manufacturing the disk 26 is simplified. Further, properties that vary continuously from the core 20 to the excitation light guide 22 are obtained (properties for which no boundary is present between the core 20 and the excitation light guide 22). The doping amount distribution of the rare earth element in the core 20 can be controlled. A core can be also obtained in which the rare earth element concentration is at a maximum in the central section of the laser beam.

The YAG (polycrystalline material) manufactured in the second embodiment is not oriented. However, the YAG is isotropic and transparent despite being nonoriented. Where heat generation follows laser oscillations, the birefringence effect is demonstrated. The oriented YAG is advantageous for compensating the birefringence effect. However, in the second embodiment, the cooling is effective and therefore, laser oscillations are obtained with high efficiency even though the YAG is not oriented.

Variation 1 of the Second Embodiment

In the above-described example, the YAG is doped with Er, but rare earth elements other than Er may be also used for doping. FIG. 10 shows the rare earth elements arranged in the order of increasing magnetization ratio obtained by doping therewith. A rare earth element of any type included in FIG. 10 can be used for doping.

By adjusting the intensity distribution of the magnetic field into which the slurry to be immobilized is placed, it is possible to control the region that is rich in the YAG doped with a rare earth element, that is, control the shape of the core serving as an oscillation spot, or control the number of the present cores serving as the oscillation spots.

Variation 2 of the Second Embodiment

Even when a slurry is used that is prepared by mixing $Y_2O_3$ doped with a rare earth element and $Y_2O_3$ undoped with a rare earth element, it is possible to manufacture a translucent polycrystalline optical material in which a region rich in $Y_2O_3$ doped with a rare earth element and a region rich in $Y_2O_3$ undoped with a rare earth element have been controlled. Since $Y_2O_3$ basically has no magnetic anisotropy, a uniformly nonoriented translucent polycrystalline optical material is obtained.

Third Embodiment

This embodiment corresponds to Case 2-2. The slurry was immobilized in a gradient magnetic field with a spatially varying intensity, and a translucent polycrystalline material with a composition and an orientation state varying in the material was manufactured.

<Single Crystals Used>

A slurry including a group of single crystal grains of FAP doped with Dy and a group of single crystal grains of FAP undoped with a rare earth element was used.

The FAP has magnetic anisotropy. However, the magnetic anisotropy of the FAP undoped with a rare earth element is small, and where the intensity of the magnetic field into which the immobilizing slurry is placed is suitably adjusted, it is possible to obtain a relationship such that the FAP undoped with a rare earth element does not rotate.

The FAP doped with a rare earth element has large magnetic anisotropy. The FAP doped with a rare earth element rotates even when the magnetic field intensity is such that the FAP undoped with a rare earth element does not rotate. Further, when the magnetic field intensity is such that the FAP undoped with a rare earth element does not rotate, the FAP doped with a rare earth element is acted upon by a strong translation force, and the FAP undoped with a rare earth element is acted upon by a weak translation force.

<Immobilization>

Since the axis of easy magnetization of the FAP doped with Dy becomes the c-axis, the immobilization process shown in FIG. 4 was used. The magnetic flux density in the central section was 3.5 T.

The axis of easy magnetization of the FAP doped with at least one species selected from the group including cerium (Ce), praseodymium (Pr), neodymium (Nd), terbium (Tb), dysprosium (Dy), and holmium (Ho) becomes the c-axis. Therefore, the immobilization process shown in FIG. 4 is used.

The axis of easy magnetization of the FAP doped with at least one species selected from the group including promethium (Pm), samarium (Sm), erbium (Er), thulium (Tm), and ytterbium (Yb) becomes the a-axis. Therefore, the immobilization process shown in FIG. 5 is used.

In either case, the immobilization is performed under a condition that the magnetic field intensity is adjusted to a level such that the FAP undoped with a rare earth element does not rotate, and the FAP doped with a rare earth element rotates.

<Obtained Polycrystalline Material>

A disk with a diameter of 15 mm and a thickness of 2 mm was obtained after the immobilization. The composition distribution was such that the center was rich in the Dy-doped FAP, whereas the periphery was rich in the FAP undoped with a rare earth element. In the center, the Dy-doped FAP was oriented. On the periphery, the FAP undoped with a rare earth element was nonoriented.

This translucent polycrystalline material enabled further improvement of the laser oscillation device shown in FIG. 8. As shown in FIG. 7, since a peripheral region 12 included no emission centers, no laser oscillation is produced. However, this region is translucent, while scattering the light, and can guide the excitation light. Since the central region has emission centers and is transparent, laser oscillations are obtained. The periphery 12 becomes the excitation light guide 22, and the center 10 becomes the core 20. Where the side surface of the excitation light guide 12 (22) is irradiated with an excitation light 14 from the radially outer side, a laser beam 16 is emitted from the center 10.

The translucent polycrystalline material shown in FIG. 7 has the following specific features.

(1) The center 10 (core 20) can be formed from anisotropic FAP, and the laser oscillation efficiency can be increased.

(2) A structure without a boundary between the center 10 (core 20) and periphery 12 (the excitation light guide 22) can be realized.

(3) The shape of the core 20 and the number of cores can be controlled.

(4) The excitation light can be controlled using the excitation light guide 22 that scatters the light. For example, the intensity distribution of the excitation light matching the intensity distribution of the laser beam can be produced. Alternatively, an aperture effect in which light scattering is intentionally used can be also obtained.

(5) The doping amount distribution of a rare earth element in the core 20 can be also controlled. The core 20 with a maximum rare earth concentration in the central section of the laser beam can be also obtained.

(6) The distribution of orientation degree in the core 20 can be also controlled.

The material of Case 2-2 can be used both for the applications of materials having a composition distribution and the applications of materials having au uneven distribution of orientation degree. Further, it is also possible to realize a material combining the two types of applications, for example, an optical material having a transparent core with emission centers and a scattering excitation light guide having no emission centers.

Fourth Embodiment

This embodiment corresponds to Case 2-3-$a$. A translucent polycrystalline material with a composition varying in the material, but crystal orientations uniformly aligned in the material was manufactured.

<Single Crystals Used>

A slurry including a group of single crystal grains of Dy-doped FAP and a group of single crystal grains of Nd-doped FAP was used.

The axis of easy magnetization is the c-axis in both the Dy-doped FAP and the Nd doped FAP. When placed in a gradient magnetic field, the Dy-doped FAP is acted upon by a strong translation force and the Nd-doped FAP is acted upon by a weak translation force.

<Immobilization>

Since the axis of easy magnetization is the c-axis, the immobilization process shown in FIG. 4 was used and the magnetic flux density in the central section was 10 T. A large number of Dy-doped FAP grains acted upon by a strong translation force have collected in the central section to which a strong magnetic field was applied.

<Obtained Polycrystalline Material>

A disk with a diameter of 15 mm and a thickness of 2 mm was obtained after the immobilization. The composition distribution was such that the center was rich in the Dy-doped FAP, whereas the periphery was rich in the Nd-doped FAP, The FAP was uniformly c-axis oriented both in the center and in the periphery.

<Sintering>

The disk after the immobilization was processed by presintering. The presintered disk was treated by hot isostatic pressing (HIP) treatment, in which the presintered disk is not sealed in a capsule (capsule-free treatment) and sintered for 1 h under argon atmosphere pressurized to 196 MPa at a heating temperature of 1873 K. A translucent polycrystalline material was obtained.

Fifth Embodiment

This embodiment corresponds to Case 2-3-$b$. A translucent polycrystalline material with a composition and crystal orientation varying in the material was manufactured.

<Single Crystals Used>

A slurry including a group of single crystal grains of Nd-doped FAP and a group of single crystal grains of undoped FAP was used.

The axis of easy magnetization is the c-axis in the Nd-doped FAP and the a-axis in the undoped FAP. When placed in a strong magnetic field, the undoped FAP is acted upon by a weak translation force (repulsion force) and the Nd-doped FAP is acted upon by a strong translation force (centripetal force).

<Immobilization>

The magnetic flux density in the central section was set to 10 T by using the device shown in FIG. 4.

<Obtained Polycrystalline Material>

A disk with a diameter of 15 mm and a thickness of 2 mm was obtained after the immobilization. The composition distribution was such that the center was rich in the Nd-doped FAP, whereas the periphery was rich in the undoped FAP.

Further, in the center, the Nd-doped FAP was oriented in the thickness direction, whereas on the periphery, the c-axis of the undoped FAP was aligned in the disk plane. The FAP on the periphery is not oriented when observed from the direction perpendicular to the disk.

<Sintering>

The disk after the immobilization was processed by presintering. The presintered disk was treated by hot isostatic pressing (HIP) treatment, in which the presintered disk is not sealed in a capsule (capsule-free treatment) and sintered for 1 h under argon atmosphere pressurized to 196 MPa at a heating temperature of 1873 K. A translucent polycrystalline material was obtained. This material is useful when a wavelength is stabilized by refractive index modulation or when the band is narrowed by refractive index modulation. It is also effective for realizing a microresonator using the difference in refractive index.

The cases in which the YAG and FAP are used are explained above, but the single crystals that can be used in the present invention are not limited thereto. For example, single crystals constituted by yttrium orthovanadate represented by the chemical formula $YVO_4$, gadolinium orthovanadate represented by the chemical formula $GdVO_4$, lutetium orthovanadate represented by the chemical formula $LuVO_4$, SFAP, SVAP, and alumina-containing compounds, single crystals constituted by compounds of an yttrium lithium fluoride system, $Y_2O_3$, $Sc_2O_3$, and the like can be also used.

Among them, fluoroapatites, hydroxyapatites and vanadium apatites represented by the chemical formula $\alpha_5(\beta O_4)_3\gamma_2$ ($\alpha$ is Ca or Sr; $\beta$ is P or V; $\gamma$ is OH or F), for example, $Ca_5(PO_4)_3F$, $Sr_5(PO_4)_3F$, $Sr_5(VO_4)_3F$, $Ca_5(VO_4)_3F$, $Ca_5(PO_4)_3OH$, $Sr_5(PO_4)_3OH$, $Sr_5(VO_4)_3OH$, and $Ca_5(VO_4)_3OH$, are suitable for use.

Rare earth elements of a plurality of types may be doped in each single crystal grain. The slurry may include single crystal grains of two or more types.

The translucent polycrystalline material manufactured in accordance with the present invention can be used for manufacturing various optical components such as laser medium, optical substrates, windows, lenses, prisms, beam splitters, waveguides, and filters.

The technical elements explained in this specification or the drawings achieve their technical utility individually or in various combinations thereof, and are not limited to the combinations set forth in the claims at the time of the filing of this application. Further, the technology described in this specification or drawings achieves a plurality of objects at the same time, and has technical utility even if it achieves one of the plurality of objects.

The technical scope of the claims described hereinbelow is not limited to the examples, which are merely illustrating examples. The present invention can be implemented in a variety of modes subjected to changes or modifications that could be performed by a person skilled in the art, without departing from the scope of the present invention.

S1: Preparing Single Crystal grains
S2: Preparing a Slurry
S3: Immobilizing Single Crystal Grains
S4: Sintering
2: superconductive magnet
2a: magnetic field space
3a, 3b: electromagnet
4, 5: gypsum mold
6, 7a, 7b: permanent magnet
s: turntable
10: core
12: excitation light guide
14: excitation light
16: laser beam

What is claimed is:

1. A method for manufacturing a translucent polycrystalline material with optical properties varying in the material, comprising the steps of:
   immobilizing a slurry, which includes a group of single crystal grains that are acted upon by a force when placed in a magnetic field, in a gradient magnetic field with a spatially varying magnetic flux density; and
   sintering the immobilized material.

2. The method for manufacturing a translucent polycrystalline material according to claim 1, wherein the slurry includes a group of single crystal grains doped with a rare earth element.

3. The method for manufacturing a translucent polycrystalline material according to claim 1, wherein the slurry includes a group of single crystal grains different from each other in composition, the group of single crystal grains being acted upon by a translation force when the grains are placed in the gradient magnetic field.

4. The method for manufacturing a translucent polycrystalline material according to claim 1, wherein the slurry includes a group of single crystal grains different from each other in composition, the group of single crystal grains being acted upon by a rotating force when the grains are placed in the magnetic field.

5. The method for manufacturing a translucent polycrystalline material according to claim 1, wherein the slurry includes a group of single crystal grains different from each other in composition, the group of single crystal grains being in a crystal orientation stabilized when the grains are placed in the magnetic field.

* * * * *